United States Patent

Espenschied et al.

[15] 3,659,481
[45] May 2, 1972

[54] ELECTRO-HYDRAULIC DRIVE WITH REGULATED PRESSURE

[72] Inventors: Helmut Espenschied, Ludwigsburg; Georg Rothfuss, Ditzingen; Gerhard Will, Beutelsbach, all of Germany

[73] Assignee: Robert Bosch GmbH, Stuttgart, Germany

[22] Filed: June 25, 1970

[21] Appl. No.: 49,844

[30] Foreign Application Priority Data

June 28, 1969 Germany.....................P 19 32 986.3

[52] U.S. Cl.............................................74/731
[51] Int. Cl.........................................F16h 47/00
[58] Field of Search.................................74/731

[56] References Cited

UNITED STATES PATENTS 3,158,037  11/1964  Searles....................................74/731
3,397,596  8/1968   Lubinski..................................74/731

*Primary Examiner*—C. J. Husar
*Attorney*—Michael S. Striker

[57] ABSTRACT

A planetary hydraulic transmission is shifted between different stages by hydraulic operating means which receive pressure fluid whose pressure is adjusted by pressure regulating means which respond to control signals transmitted by an electronic control apparatus. The control signals represent a desired drive torque determined by the electronic control apparatus from signals received from means sensing various operational conditions of the drive motor of a car driven by the drive motor through the transmission. Since the regulated pressure is proportional to the drive torque, load peaks are prevented during shifting of the transmission.

10 Claims, 6 Drawing Figures

INVENTORS:
Helmut ESPENSCHIED
Georg ROTHFUSS
Gerhard WILL

By
Michael J. Striker
their ATTORNEY

ELECTRO-HYDRAULIC DRIVE WITH REGULATED PRESSURE

BACKGROUND OF THE INVENTION

The present invention is concerned with an electro-hydraulic drive and more particularly with electro-hydraulic apparatus controlled by an electronic control apparatus for shifting a differential transmission between several gear stages.

It is well known to provide a motor car with an automatically controlled transmission, preferably including a hydraulic converter and a planetary gear transmission including brake bands and clutches which are actuated by hydraulic motors when the operational conditions require the shifting of gears. Transmissions of this type are, for example, disclosed in the German DT—O.S 1945460 and in the publication "Automatische Getriebe" published by the Umschauberlag, Frankfurt/M on pages 17 and 18 in an article describing the fully automatic transmission of the Volkswagen 1600. The book "Automatische Automobilgetriebe in Europa" by J. Stueper, published by the "Springer Verlag" 1965, on page 334 also illustrates and describes a transmission shifted by the operation of brake bands and provided with means for indicating the condition of the brake bands.

It is known to control and shift automatic transmissions of this type by hydraulic servo motors. The hydraulic operating medium is supplied to the respective servo motors by means of magnetically operated valves. The electro-hydraulic shifting apparatus according to the prior art has the disadvantage that it is difficult to shift from one gear stage to the other without causing a very great load peak for the transmission, clutches, and other shifting devices, and the shifting of the transmission causes a noticeable jerk, which is undesirable.

SUMMARY OF THE INVENTION

It is one object of the invention to overcome the disadvantages of known electro-hydraulic drives and more particularly of electro-hydraulic gear shifting apparatus, and to provide an electro-hydraulic apparatus permitting the shifting of gears in an automatic transmission without high load peaks at some operational conditions.

Another object of the invention is to provide an efficient electro-hydraulic drive in which a planetary transmission is automatically shifted under the control of electronic control apparatus.

With these objects in view, the present invention provides an electro-hydraulic gear shifting apparatus with a primary pressure regulating means which adjusts the pressure of the hydraulic operating medium to a value represented by an electronic control apparatus which produces control signals representing the desired torque for driving the automobile based on sensed information regarding operational conditions of the motor, transmission, and car. Furthermore, hydraulic servo motors by which brake bands or clutch elements of the transmission are operated for shifting the gear stage to another, are operated by hydraulic pressure medium whose pressure is adjusted by secondary pressure regulating means. The pressure produced by the secondary pressure regulating means rises to the pressure produced by the primary pressure regulating means in accordance with functions to which the electronic control apparatus is programmed. Since the torques transmitted by the clutch elements or brake elements of the planetary transmission, is substantially proportional to the friction producing pressure, which again corresponds to the pressures at the output of the pressure regulating means, it is possible to determine by the electronic control apparatus continuously the torque transmitted by each brake element or clutch element in such a manner that no load peaks occur. Each newly connected gear stage can take over the drive torque continuously and in accordance with the function according to which the electronic control apparatus operates so that rapid shifting of gears, producing high load peaks, are prevented. By correcting the function of the electronic control apparatus, the relation between the output torque, and the hydraulic pressure produced by the primary pressure regulating means, can be adapted to specific operational conditions.

In the preferred embodiment of the invention, the pressure regulating means are electro-hydraulic converters controlled by signals from the electronic control apparatus, which transform sequences of control signals into steady pressures. It is advantageous to construct the primary pressure regulating means with a plurality of pressure amplifying stages, the most sensitive stage including an electro-hydraulic converter for transforming the sequences of electric control signals produced by the electronic control apparatus into steady pressures. Due to the fact that the electronic control apparatus does not produce continuous control voltages, but generates sequences of control signals or pulses, whose frequency and/or pulse amplitude is a function of the signal to be transmitted, the arrangement can operate with comparatively few parts, and the input of the electronic control apparatus is not sensitive to outside disturbances, such as a stray field produced by ignition sparks or magnets.

In a preferred embodiment, which is particularly suitable for planetary gear transmissions, the brake bands are coupled with electric switches which are operated in such a manner that, under control of the electronic control apparatus the brake elements are operated in such a sequence and manner that they have the effect of an overrunning clutch.

An electro-hydraulic drive incorporating the present invention comprises a motor, a multi-stage transmission driven by the motor and including hydraulic operating means for shifting the transmission between different stages; sensing means for producing sensing signals representing operational conditions of the motor, transmission, and car driven by the same; electronic control apparatus controlled by the sensing signals to generate control signals representing the torque desirable for the sensed operational conditions; pressure conduit means; a source of pressure fluid communicating with the pressure conduit means; primary pressure regulating means connected with the pressure conduit means and controlled by the control signals to adjust the pressure in the same in proportion to the desirable torque represented by the signals of the electronic control apparatus; control conduit means connecting the pressure conduit means with the hydraulic operating means of the transmission; and secondary pressure regulating means connected with the control conduit means and receiving control signals from the control apparatus to adjust the pressure in the control conduit means to the adjusted pressure in the pressure conduit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
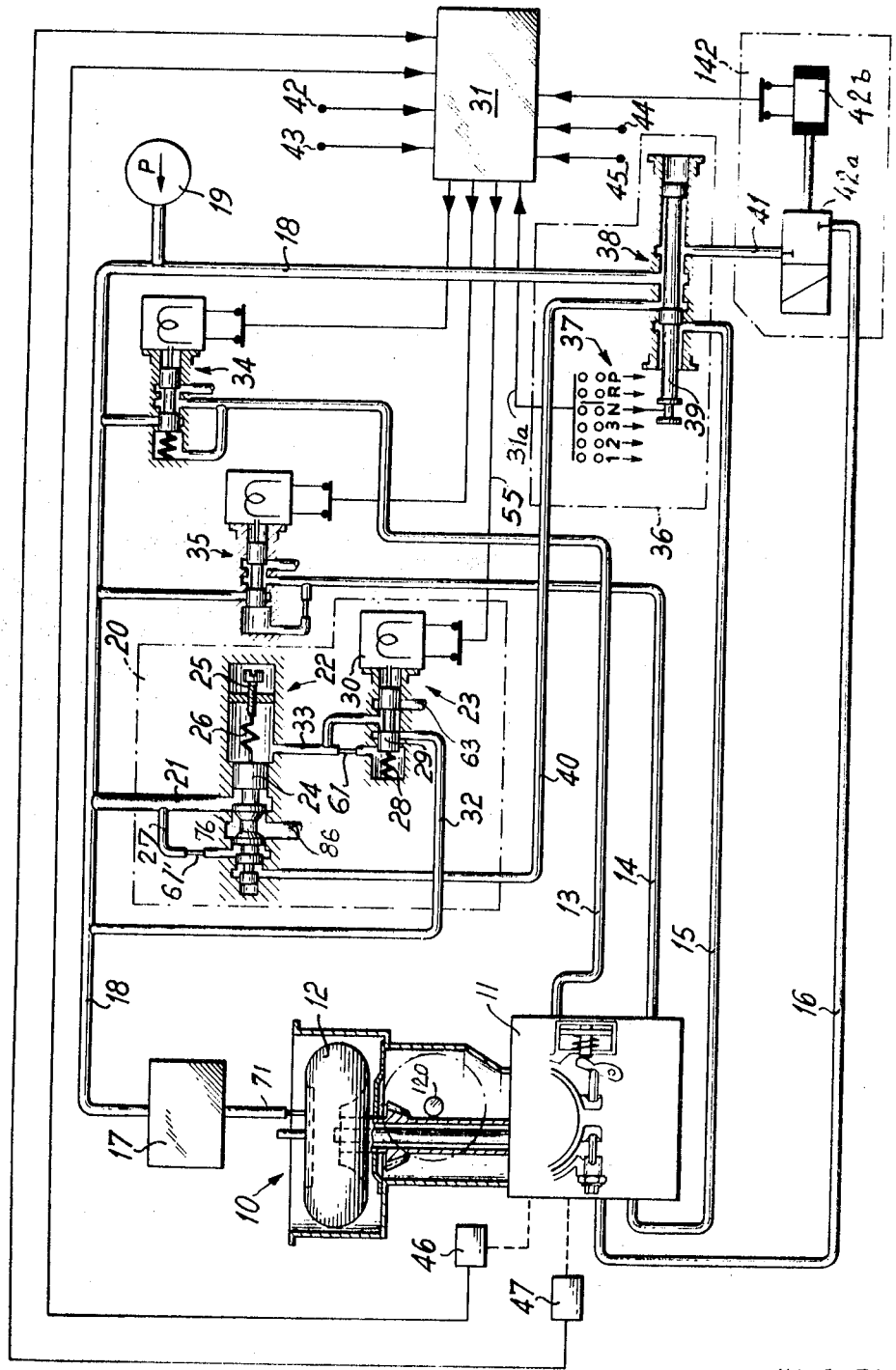
FIG. 1 is a schematic and diagrammatic view illustrating an embodiment of the invention.

An automatic transmission includes a torque converter or hydraulic clutch 12 whose output shaft is connected with a planetary transmission 11. A shaft 120 is driven from the planetary transmission 11 through bevel gears, and drives the wheels of a car. A transmission of this type is used in the Volkswagen 1600.

The transmission 11 is shifted by hydraulic servo motors which act on brake bands, and receive operating fluid through control conduits 13, 14, 15 and 16. Pressure conduit means 18 receive pressure fluid from a pump 19, and the converter 12 receives fluid at a pressure reduced in the pressure regulator 17. Pressure regulator 17 is shown on an enlarged scale in FIG. 3. A conduit 67 connects a chamber formed by a piston 68 in cylinder 70, with the pressure conduit 18. The regulating piston 68 is displaced by the pressure against the action of the spring 69 which abuts an end plate of cylinder 70. In the illustrated position, the regulating piston 68 closes a return flow outlet 71 which is connected to an open container from which pump 19 may draw fluid. The discharge of fluid from outlet 71 is schematically indicated by an arrow 0. When the hydraulic pressure acting on piston 68 is sufficient high so that spring 69 is compressed and outlet 71 is at least partly opened, fluid is discharged and the pressure in outlet 71 is reduced as compared with the pressure prevailing in the pressure conduit 18 so that the hydraulic converter 12 receives fluid at the proper pressure. The pressure value at which the regulation starts, depends on the rigidity of the regulator spring 69.

The pressure in the pressure conduit 18 is regulated by primary pressure regulating means 20 which include two stages 23 and 22. Stage 23 is an electro-hydraulic converter which is shown on an enlarged scale in FIG. 2. The embodiment of FIG. 1 includes other electro-hydraulic converters 34, 35 for regulating the pressure whose construction corresponds to the construction of electro-hydraulic converter 23 as shown in FIG. 2 in detail.

The purpose of the electro-hydraulic converters 23, 34, 35 is to produce a pressure in a pressure fluid depending on an electric control value. A valve slide 29 has two piston portions 51 and 52 and is connected with the core 53 in the winding 54 of an electro-magnet which receives control pulses through conductors 55 from an electronic control apparatus 31. Slide 29 is slidable in cylinder 56 which has an inlet port 57 in a conduit 32 which is connected with the pressure conduit 18 to which pump 19 supplies pressure fluid. A pressure outlet 59 is provided which is connected with conduit 33 leading to the pressure regulator 22. A return conduit 60 has a throttle 61 and connects conduit 33 with the cylinder 56. The conduit 60, 61 determines the amount of fluid returned to the cylinder. Piston portion 51 abuts a spring 62 supported by an end plate of cylinder 56, and piston portion 52 can close the port 63 of an outlet to an open container, as indicated by the arrow 0.

When the electric control value supplied by signals from the electronic control apparatus 31 through conductors 55 is absent, slide 29 is in the illustrated position, and inlet 57 is completely closed by piston portion 51 so that no pressure develops in outlet 59. When electric pulses are supplied to the winding 54, the core is displaced to the left as viewed in the drawing against the action of spring 62 so that a small gap forms between the piston portion 51 and port 57, and pressure fluid from conduits 18 and 32 flows through the cylinder to the outlet 59 so that a pressure $P_2$ develops. Piston portion 52 in its left end position, closes outlet port 63. Slide 29 can move until all forces acting on opposite sides are in equilibrium. In the balanced condition of slide 29, the magnetic force is equal to the sum of the force of spring 62 and of the fluid pressure of the fluid supplied by the return conduit 60 and acting on piston portion 51. Consequently, the pressure $P_2$ is a function of the magnetic force of the electro-magnetic means 54, 53, since the sum of the spring force of spring 62 and the pressure of the pressure fluid acting on piston portion 51 must become greater as the magnetic force is increased, which is only possible when the pressure $P_2$ rises. In the left end position of slide 29, the outlet port 63 and the return conduit 60 are completely covered and closed, so that the full pressure of pump 19 prevails in outlet conduit 59, 33.

Figure 2:
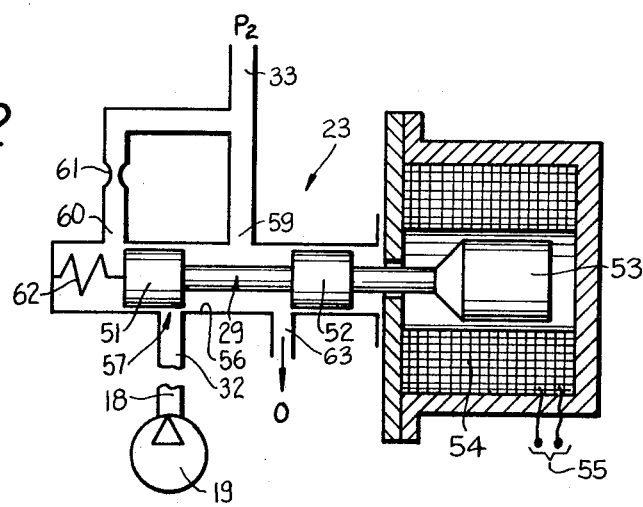
FIG. 2 is a schematic sectional view illustrating an electro-hydraulic converter used in the embodiment of FIG. 1.
Figure 4:
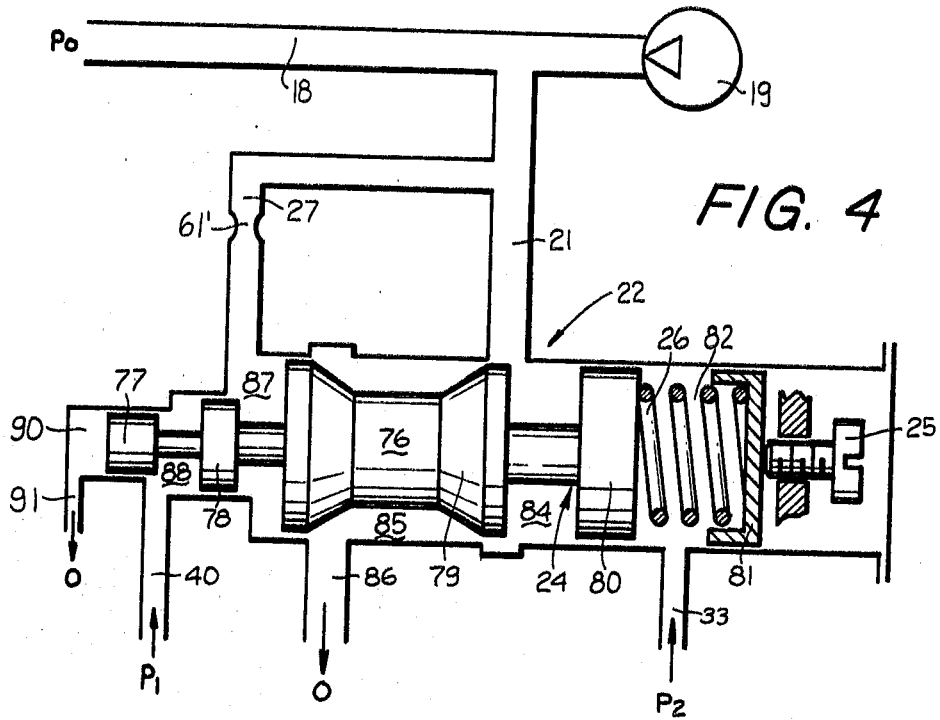
FIG. 4 is a schematic sectional view illustrating a hydraulic spring biassed pressure regulator used in the embodiment of FIG. 1.

As is apparent from FIG. 1, the pressure fluid flowing at the pressure $P_2$ through conduit 33 is supplied to the cylinder of a pressure regulating means 22, which is shown on an enlarged scale in FIG. 4.

The hydraulic regulator 22 adjusts the pressure $P_0$ in the pressure conduit 18 by permitting a controlled part of the hydraulic fluid medium pumped by pump 19, to flow into an open container, as indicated by an arrow 0.

A slide 76 has a plurality of piston portions 77, 78, 79 and 80. Piston portion 80 abuts a spring 26 which is supported by an end plate 81 whose position can be adjusted by a screw 25. Spring 26 which determines an initial pressure, is located in a control pressure chamber 82 into which conduit 33 opens to supply pressure fluid at the pressure $P_2$, as explained with reference to FIG. 2.

Between piston portion 79 and piston portion 80, an inlet chamber 84 is formed which communicates through a conduit 71 with a pressure conduit 18 in which the main pressure $P_0$ prevails. Piston portion 79 has two frusto-conical end members, and a cylindrical connecting portion. An annular outlet chamber 85 is formed by piston portion 79, and communicates with the outlet 86 which is connected with the low pressure space as indicated by the arrow 0. A return chamber 87 is formed between piston portions 78 and 79 and communicates through a conduit 27 which has a throttle 61', with conduit 21 leading to pressure conduit 18. Between piston portions 77 and 78, a counter pressure chamber 88 is provided to which pressure fluid having the pressure $P_1$ is supplied. A small outlet 91 is provided in a chamber 90 bounded by piston portion 77, and serves the purpose of discharging leaking pressure fluid into an open low pressure space, as indicated by the arrow 0.

In the position illustrated in FIG. 4, the valve slide 76 is in its left end position in which the inlet chamber 84 is completely closed so that the full pressure produced by pump 19 prevails in pressure conduit $P_0$. Slide 76 is balanced in the left end position by the opposing forces acting in chambers 82 and 87. The pressure $P_2$ of the fluid supplied through conduit 33 from the electro-hydraulic pressure regulating means 23 and the pressure of spring 26 act in one direction, while the pressure of the pressure fluid returned from pressure conduit 18 through conduit 27 acts in chamber 87 to balance valve slide 76.

Figure 5:
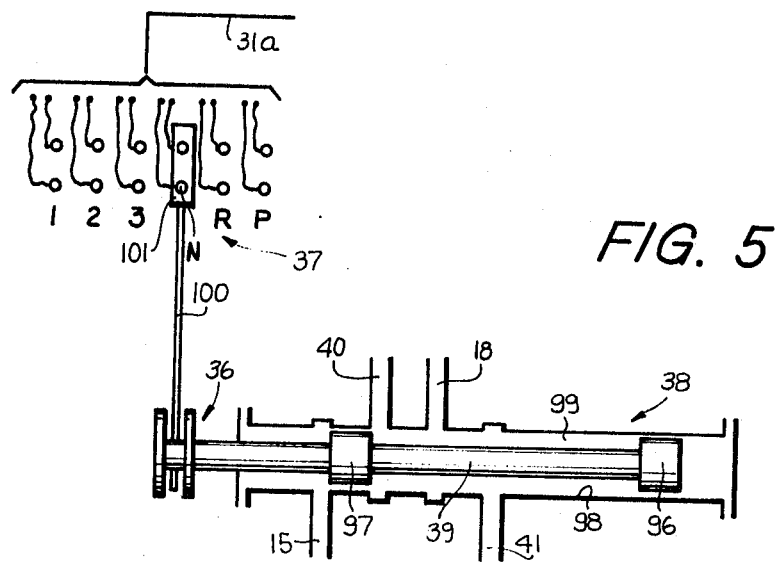
FIG. 5 is a schematic sectional view illustrating a hydraulic selector switch used in the embodiment of FIG. 1.

The pressure $P_1$ of the pressure fluid supplied through conduit 40, depends on the position of the hydraulic selector switch 38, see also FIG. 5, which has five positions associated with the first, the second, third stage of the transmission, with neutral, reverse, and parking. Only in the position R, in which the transmission 11 operates shaft 120 in reverse, no pressure fluid is supplied through conduit 40 to chamber 88. Consequently, the pressure $P_0$ is a maximum in the position R of the hydraulic selector switch 36, while in all other positions of the selector switch, the counter pressure $P_1$ opposes the control pressure $P_2$, and only the pressure differential between the pressures $P_1$ and $P_2$ controls the movement of the slide 76.

The pressure $P_2$ produces in chamber 82 a force acting on piston portion 80, together with the force of the pretensioned spring 26. The force of spring 26 can be adjusted by the adjusting screw 25. No force acting in one direction on slide 76 is produced in the inner chamber 84, since the effective surfaces of piston portion 79 and 80 are equal.

In one position of slide 76, and of piston portion 79, pressure fluid can enter the outlet chamber 85 and flow out of the outlet 86 into a low pressure space since the outlet opening 86 is opened and closed by the piston portion 79. The pressure fluid in conduits 21 and 18, where the pressure $P_0$ prevails, enters chamber 87 through conduit 27 and throttle 61'. Chamber 87 is bounded on one side by piston portion 78 and on the other side by the larger effective surface of piston portion 79, so that in this chamber 87, a force is exerted on valve slide 76 which opposes the force acting on the valve slide in chamber 82. Assuming a constant pressure $P_1$, valve slide 76 is displaced until all forces acting in chamber 82 are balanced by the force exerted by the pressure fluid in chamber 87. In this condition of the valve slide, the pressure $P_o$ corresponds to the pressure required by the control pressure $P_2$, and since pressure $P_2$ is proportionate to the value represented by the signals of the electronic control apparatus 31, the adjusted pressure $P_o$ is also proportionate to this value.

The control conduit 13 which is connected with the hydraulic operating means in the transmission 11 by which shifting of the transmission is effected, is connected by an electro-hydraulic pressure regulator 34 with the pressure conduit 18, and a corresponding control conduit 14, is connected by an electro-hydraulic pressure regulator 35 to pressure conduit 18, the pressure regulators 34 and 35 being electro-hydraulic converters of the type described with reference to FIG. 2. Electric signals are supplied to the electro-magnetic means of the secondary pressure regulating means 34 and 35 from the electronic control apparatus 31.

The main pressure conduit 18 is also connected to the cylinder of the hydraulic part 38 of a hydraulic selector switch 36 whose electric part 37 is connected with the electronic control apparatus 31.

As best seen in FIG. 5, a valve slide 39 is mounted in a valve cylinder 98, and has two piston portions 96 and 97. Depending on the position of valve slide 39, piston portions 96 and 97 connect conduits 40 and 15 and guide pressure fluid into the open conduit 47 since the chamber 99 between piston portions 96 and 97 is always connected with pressure conduit 18.

Slide 39 carries a switch arm 100 with a contact bridge 101 which in six different positions of slide 39, cooperates with pairs of contacts 1, 2, 3, N, R and P which are respectively associated with three drive stages of the transmission 11, with neutral, reverse, and parking. As noted above, conduit 40 is closed by piston portion 97 when contact bridge 101 connects the two contacts R. In the other positions of valve slide 79 and arm 100, the circuit of conductors 31a is closed, and the information regarding the selected stage of the transmission is entered into the electronic control apparatus 31.

The conduit 41 is connected with a valve 42a which is schematically shown in the open position in which no fluid is supplied from pressure conduit 18 through conduit 41 to control conduit 16 by which a hydraulic operating means of transmission 11 is controlled. Valve 42a can be shifted by electromagnetic means 42b to another position in which pressure fluid flows into control conduit 16. Electro-magnetic means 42b receives control signals from the electronic control apparatus, when required.

In addition to the information regarding the operative gear stage supplied through conductor 31a, the electronic control apparatus 31 receives other information regarding operational conditions. Suitable sensing means sense the operational conditions, and supply corresponding sensing signals to control apparatus 31. At 42, information regarding the sensed foot pedal position of the car, at 43 a kick down signal, at 44 a signal representing the speed of the car, and at 45 the number of revolutions of the motor are sensed by sensing elements which transmit corresponding sensing signals representing these operational conditions to the electronic control apparatus 31. As explained above, the planetary transmission 11 is of the well known type in which the gear stages are shifted by operation of brake bands by hydraulic operating means such as a cylinder and piston hydraulic motor. In order to supply information regarding the operational condition and position of brake elements in the planetary transmission 11, two other sensing elements in the form of sensing switches 46 and 47 are respectively actuated in actuated positions of their respective brake bands, and supply the information regarding the condition of the brake bands in the form of sensing signals to the electronic control apparatus 31. The several sensed conditions of the drive, furnish information on the basis of which the electronic control apparatus 31 computes the desired value of the drive torque, so that corresponding control signals are generated for controlling the electro-magnetic input means of the regulators 34, 35 and 23.

Figure 6:
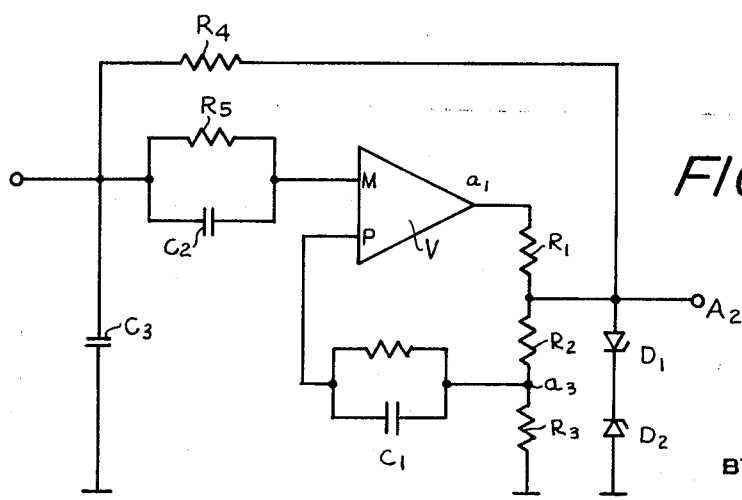
FIG. 6 is a circuit diagram illustrating a circuit of the electronic control apparatus used in the embodiment of FIG. 1, which generates a sequence of electric pulses depending on a control value and being transmitted to the electro-hydraulic converter shown in FIG. 2.

FIG. 6 illustrates a circuit which is advantageously used in the electronic control apparatus 31 for generating a sequence of electric pulses representing a control value for the purpose of controlling the regulators 34, 35 and 22. Electronic control apparatus 31 contains several circuits as shown in FIG. 6 to which the several operational conditions of the car, transmissions, and motor are supplied.

Referring now to FIG. 6, the amplifier V has a plus terminal P and a minus terminal M. The input terminal $e$ is connected by a capacitor 3 with ground, and by a resistor $R_4$ with the output terminal $a_2$. The output terminal $a_1$ of amplifier V is connected to ground by a voltage divider including three resistors $R_1$, $R_2$, $R_3$. The voltage divider has a connecting point $a_2$ between resistors $R_1$ and $R_2$, and a connecting point $a_3$ between resistors $R_2$ and $R_3$. The connecting point $a_2$ is connected with the output terminal $A_2$, and from connecting point $a_3$, a circuit, including a capacitor $C_1$ and a resistor $R_6$ connected in parallel, is connected with the plus terminal P of amplifier V. The input terminal $e$ is connected by resistor $R_5$ and by capacitor $c_2$ with the minus terminal of amplifier V. The output terminal $A_2$ is connected by a pair of back-to-back Zener diodes $D_1$ and $D_2$ with ground. The height of the output voltage of the circuit is limited by the Zener diodes $D_1$ and $D_2$ which have such a low impedance compared with the output impedance of the circuit that they ensure generation of a clean, flat-topped wave by clipping the output below the amplitude at which overshoot, ringing, or rounding can occur.

The plus terminal P of amplifier V is connected by the parallel resistor $R_6$ and capacitor $C_1$ as a positive feed back to the connector point $a_3$. When the output voltage of the amplifier V has a positive potential, part of this output voltage, which is taken from connecting point $a_3$ of the voltage divider, is fed back. Capacitor $C_3$ is positively charged over resistor $R_4$ to a maximum value which is equal to the output voltage at output terminal $A_2$. When the voltage of $C_3$ which is supplied to the minus terminal M, exceeds the voltage at the positive input terminal P of the amplifier, a control voltage is generated which "flips" the amplifier to its other end position. This voltage is also fed back to the positive terminal P through resistor $R_6$ and capacitor $C_1$. Capacitor $C_3$ discharges now, and when the voltage thereof drops below the voltage at the plus terminal P, amplifier V again "flips" to its other end position due to its high gain. Current flowing into or out of the input terminal $e$, varies the charging and discharging times of capacitor $C_3$ and thereby the ratio of the output pulses at the output terminal $A_2$.

OPERATION

Assuming that the car, which is provided with the transmission 10, is at a standstill, and that selector switch 38 has been set to a selected condition of the transmission, an increase of the number of revolutions of shaft 120 causes start of the movement of the car which is driven by the motor, not shown, through the hydraulic coupling or torque converter 12. The condition of movement and other operational conditions of the car and motor are sensed and supplied by lines 42 to 45 to the electronic control apparatus 31 which receives information regarding the position of the foot pedal, of the kick down switch, of the speed of the car, and of the number of revolutions of the motor, and transforms the information into a control signal which substantially corresponds to the drive torque. This signal, which is proportional to the drive torque but is in the form of a pulse sequence, is supplied to the electro-magnetic means 54, 53 of the electro-hydraulic converter 23 which is part of the primary pressure regulating means 20 which further includes the hydraulic pressure regulator 22. Since the pressure produced by regulator 23 in conduit 33 is proportionate to the value represented by the control signal of electronic control apparatus 31, the pressure to which the pressure fluid in pressure conduit 18 is regulated by the hydraulic regulator 22, is also proportional to the drive torque computed by electronic control apparatus 31.

The functions of the regulators 23 and 22 have been described in detail with reference to FIGS. 2 and 4. In the hydraulic pressure regulator 22, desired pressure is represented by the constant force of spring 26, which was preselected by operation of adjusting screw 25, and by the pressure of the pressure fluid entering through conduit 33 from the electro-hydraulic regulator 23. The opposing force is derived from the throttle conduit 27 and the pressure conduit 18, and also from pressure fluid supplied through conduit 40, if a stage different from reverse was selected by selector switch 36. The pressure in return conduit 27 corresponds to the pressure in the pressure conduit 18, and produces in chamber 87, a counterbalancing force which represents the actual value of the pressure in the pressure conduit 18.

The opposing force acting on slide 76 is less in the "reverse" position of the selector switch 36 than in the other positions, and consequently the pressure in the pressure conduit 18 is adjusted to a higher value.

Assuming that after the start of the movement of the car in the first stage of transmission, the second stage of the transmission is to be rendered operative, the respective brake band or clutch element of the planetary transmission 11 is released, and the brake band or clutch element associated with the next higher gear stage are rendered operative, but it is desired that the two functions overlap which is obtained by regulation of the pressure in control conduits 13 and 14 by electro-hydraulic regulators 35 and 34, respectively, under the control of control signals transmitted from the electronic control apparatus 31. The pressure in control conduit 14 of the newly selected gear stage is gradually increased by electro-hydraulic regulator 35, while the pressure in the control conduit 14 associated with the previous gear stage is gradually reduced by electro-hydraulic regulator 34. The pressure in control conduit 14 controlling the respective operating servo motor for releasing the brake band, for example, cannot exceed the maximum pressure prevailing in pressure conduit 18 in accordance with the pressure of pump 19.

The newly selected transmission stage transmits a gradually rising part of the drive torque, while the part of the torque transmitted by the previously used transmission stage is gradually reduced. When the torque of the previously used transmission stage has dropped to a minimum, so that the newly selected transmission stage can transmit the full torque of the drive motor to the car, the sensing switches 46 or 47, which are respectively coupled with the brake band of the respective gear stages, indicate this condition to the electronic control apparatus 31 which generates a control signal for completely disconnecting the brake band of the previously used transmission stage. Consequently, switches 46 and 47, together with the hydraulic servo motors operating the brake bands, as controlled by the electronic control apparatus 31, substantially have the characteristics of an overrunning clutch.

It is possible to substitute for at least one of the sensing switches 46 or 47, a timing element which starts its operation when the operating means of the new gear stage is actuated, and generates a signal for causing release of the previously used brake band after a predetermined time period.

In the illustrated embodiment, the control conduit 16 is not provided with an electro-hydraulic regulator of the type described with reference to FIG. 2, but only with the electromagnetic valve means 142. Since at higher stages of the transmission, the transferring of the drive torque from one gear stage to the other is no longer critical, it is not necessary to control the pressure in the control conduit 16 by a pressure regulator of the type shown at 35 and 34 in control conduits 13 and 14. If the transmission is shifted back from a higher stage to a lower stage, the transfer of the drive torque takes place in accordance with transfer functions determined by the electronic control apparatus 31. The sensing switches 46, 47 again obtain overrunning characteristics of the transmission during the shifting down of the transmission 11 to the next lower stage.

If during a shifting of the transmission, the elements of the used gear stage are rapidly disconnected, and the elements of the next lower gear stage are rapidly connected to transmit the drive torque, it would be theoretically possible that the motor accelerates to a number of revolutions corresponding to the next lower transmission stage. This is prevented by partially restraining the first used gear stage, and by the overrunning characteristics of the brake elements, since, as long as the brake elements do not receive a control signal from the electronic control apparatus 31 by which they are disconnected by the respective hydraulic operating means, the brake bands still transmit a part of the torque acting as a load on the drive motor so that at no time, the shaft of the drive motor is under no load.

Due to the fact that a pressure in the main pressure conduit 18 is always substantially proportional to the drive torque produced by shaft 120, no unnecessarily high load peaks can occur during shifting of transmission 11 to another stage since the torques transmitted by the brake elements or clutch elements are proportional to the pressure at which they are operated. This pressure, and thereby the maximum torque occurring during each shifting of the transmission, is a function of the load of the car.

Figure 3:
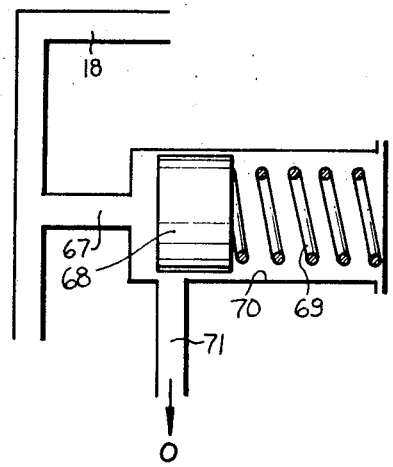
FIG. 3 is a schematic sectional view illustrating a pressure regulator used in the embodiment of FIG. 1.

The pressure regulator 17, which has been described with reference to FIG. 3, reduces the pressure in conduit 71 to a predetermined maximum below the pressure prevailing in main pressure conduit 78, so that the torque converter or hydraulic clutch 12 is not damaged by an exceedingly high fluid pressure.

It will be understood that each of the elements described above, or two or more together, may also find a useful application in other types of electro-hydraulic transmission control arrangements differing from the types described above.

While the invention has been illustrated and described as embodied in an electro-hydraulic drive including a transmission which is shifted by hydraulic operating means whose pressure is regulated by electronic control apparatus in accordance with the operational conditions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. Electro-hydraulic drive with regulated pressure, comprising rotary motor means; transmission means driven by said motor means and having a plurality of stages, said transmission means including hydraulic operating means for shifting said transmission means between said stages; sensing means including first sensing elements for sensing said stages for producing a first sensing signal representing the operative stage at which said transmission means operates, and a second sensing element for sensing at least the speed of said motor means for producing a second sensing signal representing said speed of said motor means; electronic control apparatus controlled by said first and second sensing signals to compute the drive torque required for operation with the sensed operative stage at the sensed speed, and generating control signals representing said drive torque; pressure conduit means; a source of pressure fluid communicating with said pressure conduit means; primary pressure regulating means connected with said pressure conduit means, and controlled by said control signals of said control apparatus to adjust the pressure in said pressure conduit means in proportion to said drive torque; control conduit means connecting said pressure conduit means with said hydraulic operating means of said transmission means; and second pressure regulating means connected with said control conduit means and receiving control signals from said control apparatus to adjust the pressure in said control conduit means under the control of said control apparatus to the adjusted pressure in said pressure conduit means.

2. Electro-hydraulic drive as claimed in claim 1 wherein said primary pressure regulating means includes a plurality of pressure amplifying stages, the lowest amplifying stage being the most sensitive and including an electro-hydraulic converter for transforming the sequences of control signals received from said control apparatus into steady hydraulic pressure.

3. Electro-hydraulic drive as claimed in claim 1 wherein said secondary pressure regulating means include at least one electro-hydraulic converter for transforming the sequences of control signals received from said control apparatus into steady hydraulic pressure.

4. Electro-hydraulic drive as claimed in claim 1 wherein said hydraulic operating means include first hydraulic operating means associated with selected stages of said transmission means, and second hydraulic operating means associated with other stages of said transmission means; wherein said control conduit means include first control conduit means connected with said first hydraulic operating means and second control conduit means connected with said second hydraulic operating means; wherein said secondary pressure regulating means are connected with said first control conduit means; and comprising electro-magnetic valve means in said second control conduit means controlled by said control signals of said control apparatus.

5. Electro-hydraulic drive as claimed in claim 1 wherein said first sensing elements include a plurality of sensing contact means respectively associated with different stages of said transmission means; and comprising selector means including valve means having a valve slide carrying a contact means for selectively engaging said sensing contact means in displaced positions of said valve slide, said valve means selectively connecting said pressure conduit means with said control conduit means in said displaced positions.

6. Electro-hydraulic drive as claimed in claim 1 wherein said transmission means include a planetary transmission and brake bands associated with different stages of said transmission; wherein said hydraulic operating means include a plurality of hydraulic operating elements respectively operating said brake bands; and wherein said first sensing elements are respectively actuated by operated brake bands and control said control apparatus so that the same controls said secondary pressure regulating means and said hydraulic operating means so that the brake band of a stage of said transmission is relieved when the brake band of the following stage is fully operative.

7. Electro-hydraulic drive as claimed in claim 6 wherein said first sensing elements are sensing switches.

8. Electro-hydraulic drive as claimed in claim 6 wherein said first sensing elements are timing elements started at actuation of a brake band and producing a first sensing signal for said control apparatus after a predetermined time period for causing relieving of the respective brake band.

9. Electro-hydraulic drive as claimed in claim 1 wherein said transmission means includes a gear transmission and a hydraulic coupling; wherein said pressure conduit means is connected with said hydraulic coupling; and comprising a pressure regulator in said pressure conduit means for limiting the pressure in said hydraulic coupling.

10. Electro-hydraulic drive as claimed in claim 1 wherein said primary pressure regulating means includes a plurality of pressure amplifying stages, the lowest stage being the most sensitive and including an electro-hydraulic converter for transforming the sequences of control signals received from said control apparatus into steady hydraulic pressure; wherein the next higher amplifying stage includes a valve means having a spring-biassed valve slide and being connected with said pressure conduit and with said electro-hydraulic converter for adjusting the pressure in said pressure conduit means to be proportional to said steady hydraulic pressure; wherein said secondary pressure regulating means also includes an electro-hydraulic converter for transforming the sequences of control signals received from said control apparatus into steady hydraulic pressure; and wherein each of said electro-hydraulic converters includes electromagnetic coil means connected with said control apparatus, a magnetic core, a valve slide connected with said core, and a valve cylinder having a first outlet for fluid having said steady pressure, an inlet connected with said pressure conduit means, and a second outlet for discharging fluid to a low pressure space so that said steady pressure in said first outlet is less than the pressure in said pressure conduit means.

* * * * *